US008439516B2

(12) United States Patent
Kalapodas et al.

(10) Patent No.: US 8,439,516 B2
(45) Date of Patent: May 14, 2013

(54) STEREOSCOPIC VIEW LIGHT SOURCE, WITH MULTIPLE MODES OF OPERATION

(75) Inventors: Dramos I. Kalapodas, Rexville, NY (US); Paul E. Kalapodas, Rexville, NY (US)

(73) Assignee: IP Consulting, LLC, Pompano Beach, FL (US)

( * ) Notice: Subject to any disclaimer, the term of this patent is extended or adjusted under 35 U.S.C. 154(b) by 307 days.

(21) Appl. No.: 12/422,284

(22) Filed: Apr. 12, 2009

(65) Prior Publication Data

US 2010/0259178 A1  Oct. 14, 2010

(51) Int. Cl.
*F21V 33/00* (2006.01)

(52) U.S. Cl.
USPC ............ 362/208; 362/157; 362/235; 362/237

(58) Field of Classification Search .................. 362/235, 362/240, 237, 241, 157, 217.05, 217.09, 362/243

See application file for complete search history.

(56) References Cited

U.S. PATENT DOCUMENTS

| 5,117,336 | A | * | 5/1992 | Scenzi | 362/518 |
| 6,142,649 | A | * | 11/2000 | Beghelli | 362/259 |
| 6,211,626 | B1 | * | 4/2001 | Lys et al. | 315/291 |
| 6,278,382 | B1 | * | 8/2001 | DeMarco et al. | 340/981 |
| 6,527,411 | B1 | * | 3/2003 | Sayers | 362/245 |
| 7,806,558 | B2 | * | 10/2010 | Williamson | 362/241 |
| 2002/0021573 | A1 | * | 2/2002 | Zhang | 362/555 |

\* cited by examiner

*Primary Examiner* — Anabel Ton
(74) *Attorney, Agent, or Firm* — Arthur E. Holmer

(57) ABSTRACT

A device with at least two light sources operating in context with each other under electronic control of illumination angle and intensity in order to create a wide angle stereoscopic view of the area. The device uses multiple switched sources of light situated at an angle in reference to a light source positioned along the longitudinal axis of system. The device works by sequentially switching each individual light source on and off in selected patterns at a frequency equal to or higher than 30 Hz. The device covers a selectable illumination area at variable view angles from the focused forward beam from over 3 steradians in the Left, Right, Up or Down direction, or to more than 6 steradians in full-view mode, when an axially aligned center source is present. The device finds applications, in automotive, aircraft, watercraft, space vehicles, flashlights and other fields of human activities.

2 Claims, 4 Drawing Sheets

STEREOSCOPIC VIEW LIGHT SOURCE, WITH MULTIPLE MODES OF OPERATION

This invention originates from the necessity to have a wide angle of view of illuminating a scene, rather than a limited few degrees of illumination given by focused single light sources. The developed system proves its advantages over a focused single light source when illumination of an entire panoramic area is needed, and is working by extending the field of view. The benefits are mentionable for example; at night when walking in the woods, in automobile headlights during turning, for bicycles and motorcycles or any other vehicle operating in low light conditions.

INVENTION BACKGROUND

The herein application uses the human eye's lagging reaction to the visual stimuli, which in practical terms is determined to be approximately 1 ms for detecting a change and 24 ms for the brain to process the information. In reality the response to visual information takes approximately 100 ms, thus any event happening within that time frame remains invisible to the human eye, a phenomenon called scotoma. The light system described herein, uses this blind time to switch sequentially to other light sources thus illuminating the area of interest multiple times and at different angles. By applying this concept, the whole area is illuminated at constant intensity reveling accurate stereoscopic peripheral details exceeding by far the capabilities of any single source of illumination.

For the eye to perceive a continuous motion, a minimum of 30 video frames per second have to be shown, representing a frequency of approximately 30 Hz. This means that the same view angle has to be illuminated at 30 Hz frequency, and a complete switching of the multiple light sources of the system has to occur within the 33.3 ms time frame.

This represents a switching duration (period) $T_n=8.33$ ms per light source for a four light system or a period $T_n=16.66$ ms for two light sources. Accordingly for multiple number (n) of light sources, the switching time $T_n$ is the full period T calculated for 30 Hz, divided by the number of sources, which in other words means an increase of the main oscillator frequency by the same factor, thus the total period $T_n=T/n$ respectively corresponding to a frequency of $f_n=n\,30$ Hz at the main oscillator. The intensity of the light system is adjusted by changing the duty cycle which is the ratio between $t_{ON}$ and period T of the device switching frequency $T=t_{ON}+T_{OFF}$.

For the f=30 Hz frequency the period T is T=1/f=33.3 ms at one single light device, while a five lights system will have a period $T_5=T/5=6.66$ ms, thus an oscillator frequency of f=151.5 Hz considering a duty cycle of 100% per lighting device.

The system may be assembled in a spherical dome configuration for complete 360 degrees (12.56 steradians) and be remotely controlled for special applications, in which case an increased number of light sources is required to cover a spherical dome. Accordingly, the main oscillator's frequency will be a multiple of the number of light sources used multiplied by 30 Hz. (ex. 8 sources=8×30 Hz=240 Hz min.)

The following elements of light radiation as perceived by the human eye are described below and are exploited by this system.

a) By understanding that the eye has a logarithmic response to brightness, a linear control of the source light intensity is inappropriate. For this purpose the PWM system proposed, has an Inverse Square Law response, where the intensity of the light I, is adjusted by a square of the previous value proportional to the linear increase of the distance to the object to be illuminated. This type of control will give the eye the perception of a constant illumination E factor, directly proportional to the intensity I and inversely to the distance d, to the object, without perceiving wide steps of intensity adjustment.
  b) The square law operation $E=I/d^2$, is achieved by using a logarithmic type of potentiometer in the PWM control circuit.

Light Brightness is not the pursued property in this application, but rather in this example we seek a wide angle, stereoscopic view at lower luminosity for a panoramic view. The human eye has a wide range of brightness adjustment from 120,000 lux (full color spectrum) in full sun, 0.1 lux (with no color segregation) under moonlight. This application relies on the sacrificing of the high intensity illumination in exchange for the extension of the viewable area which requires no more than 50 to 200 lux for office activities with full color range identification. For instance, a very bright light source is useless and dangerous when exploring a wooded area at night which does not reveal immediate obstacles at foot or head level, or on the left and right sides. Instead, a much lower light source with lower contrast, illuminating the surroundings will reveal every obstacle from rocks on the pathway, to branches above the head and all the details in the bushes around, and gives a panoramic view of the scenery ahead. A smooth transition with low contrast variations of light covering a wide view angle is needed for a stereoscopic view. It is known that for a luminous intensity of 1-lux of illumination covering 1 $m^2$, it takes 1-lm, or 1 Candela/str., or 1.46 mW/$m^2$ of luminous flux in the best fit visible eye spectrum of a 555 nm wavelength of the color green. The source energy has to increase exponentially with the linear increase in distance, in order to maintain the same illumination of an object. By other interpretation, the luminous intensity I, per unit of surface area varies inversely proportional to the square of the distance $d^2$ where, E is representing the light flux density in [lm/m]. This principle called the square law is used in the PWM control circuit.

For distant view applications a higher intensity spot light may be necessary, in which instance another such light source is added in the center of the dome.

The brightness of the system is directly dependant on the square law, where the electric current required to increase the luminous flux by 1 Cd/str. has to be increased by a factor of two. In case of a battery based system, the life of the battery is reduced by the same factor.

The switching control circuitry in this application, extends the battery life by having one single light source turned ON at a time, thus in principle, a multiple light source system will not consume a higher current than a single non-switched light device which is continuously in ON state. The power consumption of the light devices is increased proportionally if a longer ON time is chosen (as shown in timing diagram in FIG. 5).

DETAILED DESCRIPTION OF THE INVENTION

Figure 1:
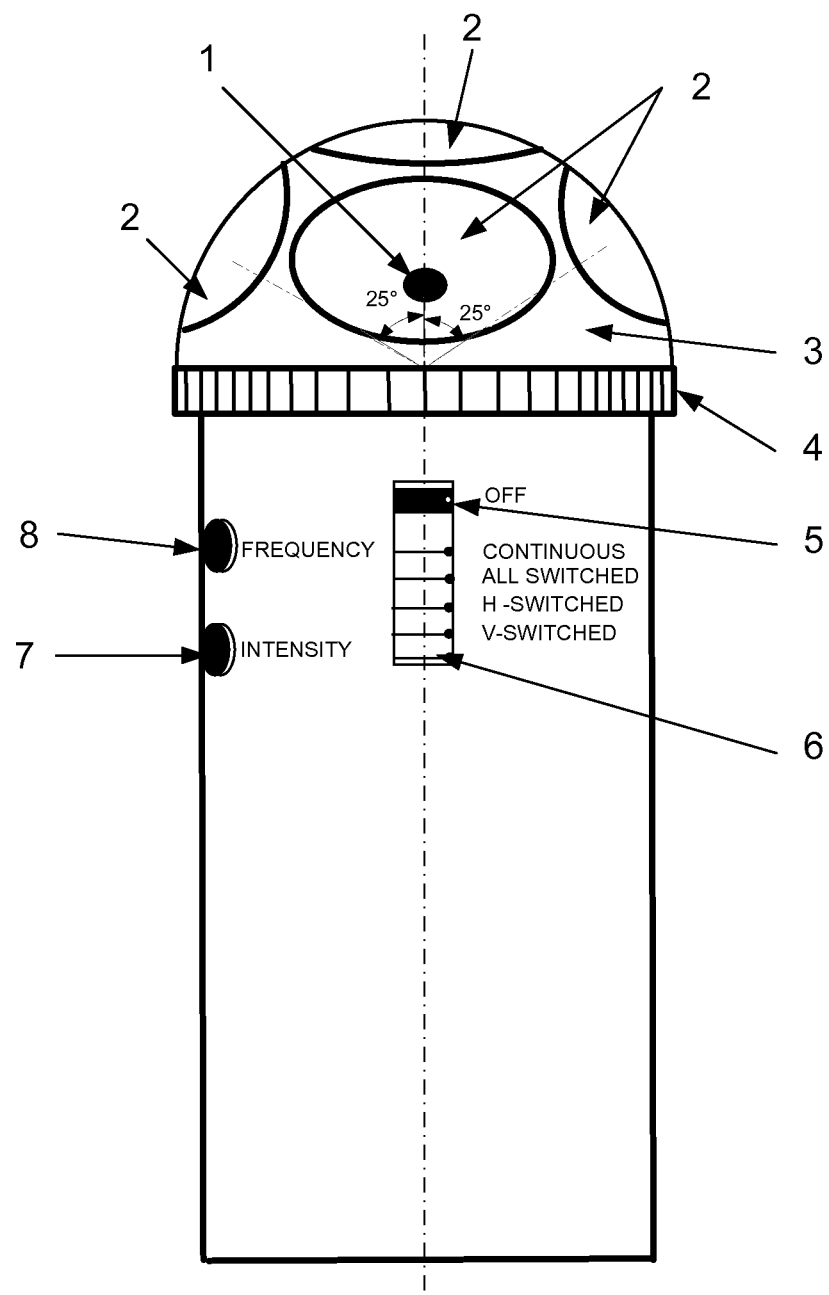
FIG. 1 represents the main view and construction elements of the stereoscopic view system.

FIG. 1, illustrates a portable system constructed of multiple light devices, five in this case, which number may vary by application, which are assembled on the surface of a semi-spherical dome, and containing a series of electronic controls for adjusting the oscillator frequency, the light intensity, and electronic switching circuitry for field of view selection.

The general view of the Stereoscopic View Light System in FIG. 1, shows the main construction elements of this system as being based on a semispherical dome 3, which is hosting the quasi-parabolic mirrors 2 containing the light sources 1, which parts 1 and 2 together are forming the light devices. Except for the top light device which is oriented along the system's longitudinal axis of symmetry, the other light devices are mounted at an initial angle of 25 degrees measured from the center of the respective light devices versus the top of same system longitudinal axis of symmetry. A light device angle adjustment ring 4, is situated at the base of the dome 3, having the function of changing the angle at which the light devices are oriented, thus allowing for a variable view angle up or down from the 5 steradians initial setting. The motion of the angle adjustment ring 4 may be automated if necessary.

FIG. 1, also depicts the On/Off power switch 5 of the system, a mode of operation switch 6 which has the role of selecting various angles of illumination further explained as; continuous, when all the light devices are continuously ON, V-SWITCHED for vertical switching where the two opposed Up and Down light devices and top light devices are switching On/Off/On allowing vertical illumination, H-SWITCHED for horizontal illumination is desired and the two opposing are switched On/Off/On, or by having ALL SWITCHED light devices On/Off/On are operating in conjunction with the top device for a full stereoscopic view at the maximum of 6 to 8 steradians spherical angle.

An intensity adjustment knob 7 controls the light intensity generated by the system. The light intensity control allow for a manual illumination adjustment following the square law principle, which control could be also automated to respond to another external incoming light source determining the requirement for a dimming effect, by receiving its input signal from various sensors like photoreceptors, velocity, acceleration, etc.

Figure 3:
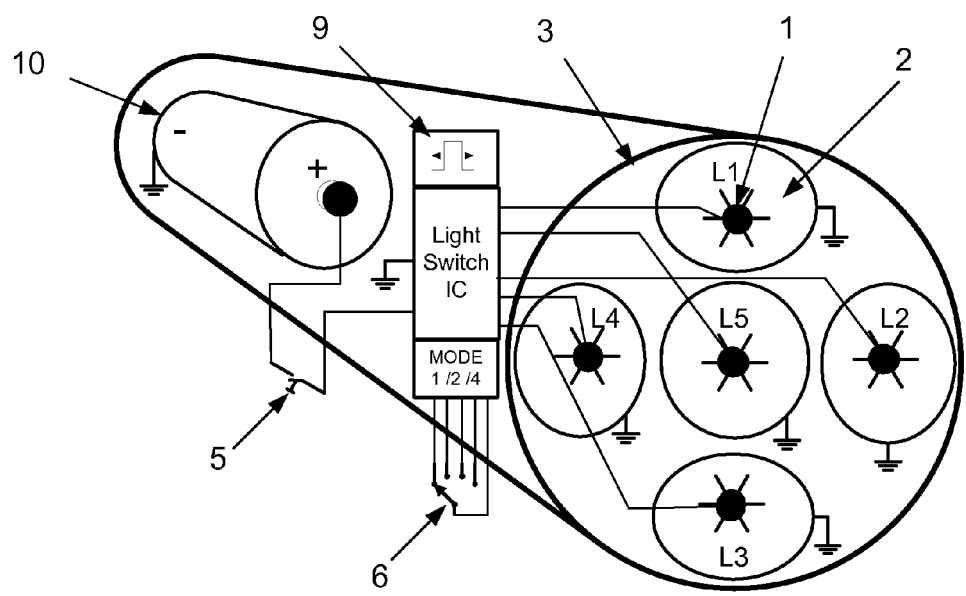
FIG. 3 is an electrical block diagram of the switching circuitry contained in a perspective sketch of the main system.

A frequency adjustment knob 8 shown in FIG. 1, permits for a fine up or down deviation of the main oscillator's clock frequency CLK, which oscillator is contained in the control block 9 of FIG. 3. Changing the oscillator frequency may be necessary in order to eliminate the flickering effect that could result from the light ray interference with other similar systems operating in the same proximity. Frequency could be automatically changed and controlled by differential processing of external parametric signals produced by photo-sensors.

Figure 2:
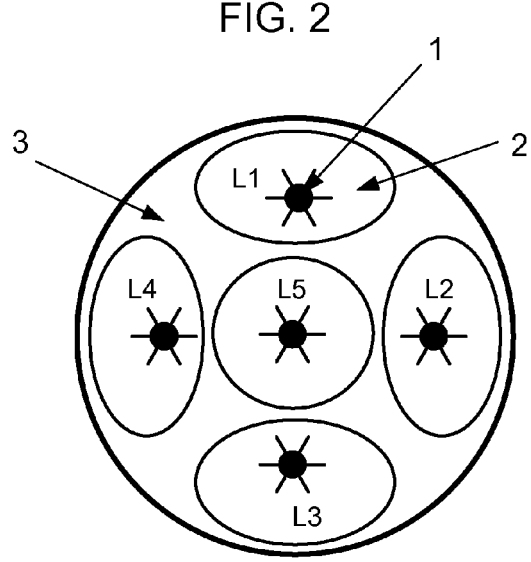
FIG. 2 represents the top view of a lighting system equipped with 5 light devices, housed in their quasi-parabolic mirrors.

FIG. 2 depicts the top view of the dome 3, and shows the position of the five light devices named L1, L2, L3, L4 and L5 on top which are constructed from a quasi-parabolic mirror 2, and a light source 1.

A quasi-parabolic mirror meaning a reflective mirror of a shape other than purely parabolic which in this case has a shallow section at the base of the parabola, which in effect gives a uniform reflection of the light rays generated by the light source, rather than focusing the beam over a small angle of view.

FIG. 3 illustrates the block diagram of the stereoscopic view light system with simplified connections from the battery 10 used as an electric power source, an On/Off power switch 5, and the electronic control circuit 9 containing a main oscillator having a clock frequency CLK which enters a shift register that sequentially controls the On/Off states of the light sources L1 through L5 in this case, and which is also programmed for selective switching of such light source devices by the selector switch 6.

Figure 4:
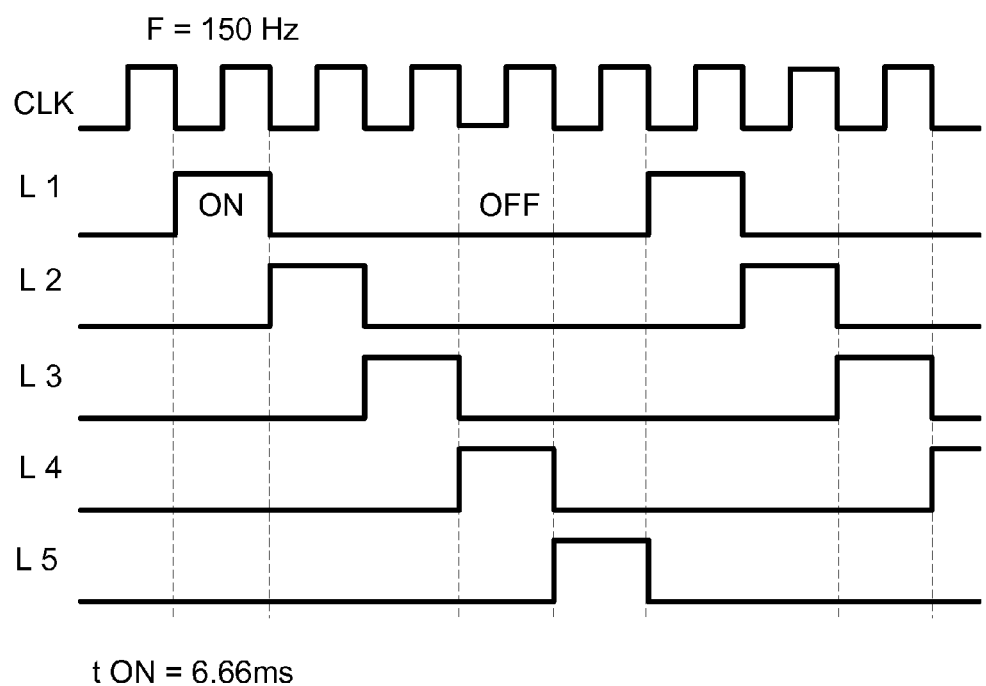
FIG. 4 is the timing diagram depicting the switching of the light devices L1, through L5 driven by a ring shift register.

FIG. 4 shows the timing diagram of the control system from the input CLK square wave pulses applied to the input of a shift register which in response switches its outputs in a sequential manner, and which outputs are connected to the light sources named L1, L2, L3, L4, and L5 determining their On/Off light status. With no interaction from the light intensity control knob, the duration of the On state at the light source point is 6.66 ms initially. In this case the electric power consumption of the system absorbed from battery is the same with the power consumed by a single light source disregarding the number of lights switched.

Figure 5:
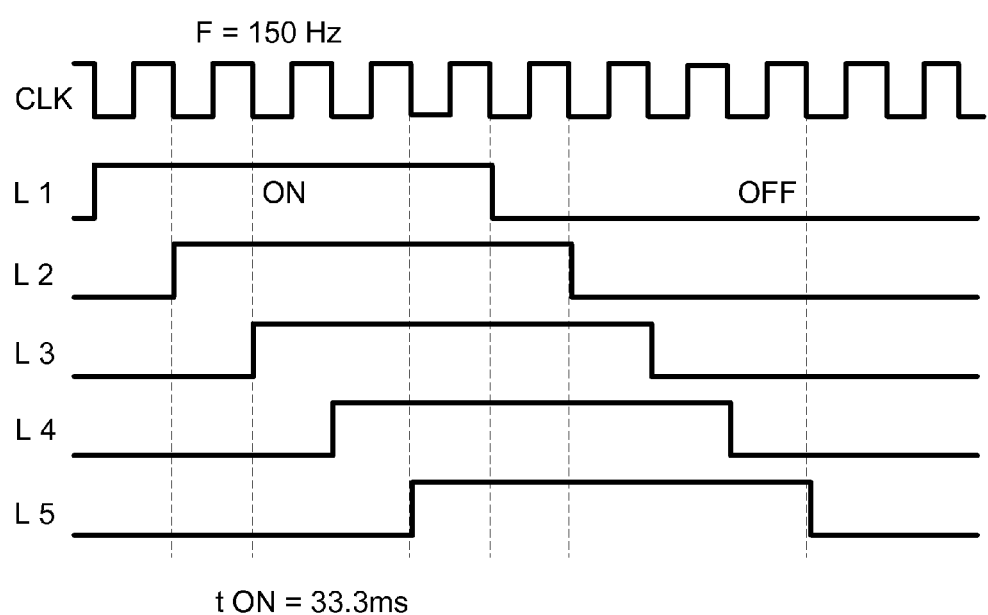
FIG. 5 is the timing diagram depicting the switching of the light devices L1, through L5 driven by a ring shift register adjusted for longer ON time, set for each light device.

FIG. 5 represents the timing diagram of the same above system which now is adjusted by the intensity knob to a longer On duration equal to 33.3 ms. Accordingly, the electrical power absorbed in this case is almost equal to the sum of the total light devices being turned On simultaneously.

For applications demanding a focused beam, a fifth, central light source is mounted on the top of dome which light can be operated in continuous or switching mode.

The prototype was built per drawings shown in FIG. 1, FIG. 2, and FIG. 3 and its performance was tested and confirmed to be accordingly with the description given in the herein context.

The invention claimed is:

1. A stereoscopic view light system comprising; a housing, said housing containing a power source, a semispherical dome attached to said housing, said dome containing at least two quasi-parabolic mirrors within said dome, at least one of said quasi-parabolic mirrors is positioned along the said system's longitudinal axis of symmetry, wherein the other quasi-parabolic mirrors have a predetermined angle with respect to the longitudinal axis, said quasi-parabolic mirrors each containing at least one respectively; a light controller comprising a power switch, mode of operation switch, frequency adjustment knob and light intensity adjustment knob electrically connected to the said system and contained within said housing; said system emitting light source from the at least two quasi parabolic mirrors in a maximum range of 6 to 8 steradians from the longitudinal axis of symmetry.

2. The stereoscopic view light system of claim 1, wherein one quasi-parabolic mirror is aligned along the longitudinal axis; said mirror labeled as L5; and four quasi-parabolic mirrors that have a predetermined angle with respect to the longitudinal axis; said non-longitudinally aligned mirrors, labeled as L1, L2, L3 and L4, respectively, are arranged symmetrically around the longitudinally aligned mirror, L5; where the said mode of operation switch provides the means for selecting specific patterns of illumination that cover a predetermined solid angle from 3 steradians to a maximum range of 6 to 8 steradians from the longitudinal axis of symmetry as following:

a. illumination over a range of 6 to 8 steradians solid angle field when all light source devices L1, L2, L3, L4 and L5 are set in on state,
b. a selected left to right field of illumination when light source devices L2, L5, and L4 are set in on state while L1 and L3 are in off state,
c. a selected up to down field of illumination when light source devices L1, L5, and L3 are set in on state, while L2 and L4 are turned off,
d. left side only illumination of approximately 3 steradians when two adjacent light source devices L1 and L4 positioned to the left side of the system are set in on state while L2, L3 and L5 are set in off state,
e. right side only illumination of approximately 3 steradians when two adjacent light source devices L2 and L3 positioned to the right side of the system are set in on state while L1, L4 and L5 are set in off state,
f. illumination over a range of 6 to 8 steradians solid angle field when all light source devices L1, L2, L3, L4 and L5 are set in on state in a continuously repeating sequence for a specified period of time; wherein each light source is turned on at a specified delay time from the previous light source.

* * * * *